United States Patent [19]

Jordan et al.

[11] 4,142,348
[45] Mar. 6, 1979

[54] SPEED CONTROL UNIT FOR DRIVING THE PICK-UP REEL OF A PEANUT COMBINE

[75] Inventors: Bertram L. Jordan; John D. Mitchell, both of Lewiston, N.C.

[73] Assignee: Harrington Manufacturing Company, Lewiston, N.C.

[21] Appl. No.: 803,522

[22] Filed: Jun. 6, 1977

[51] Int. Cl.² ............................................. A01D 89/00
[52] U.S. Cl. ..................................... 56/10.2; 56/364; 56/DIG. 2; 56/DIG. 6; 56/DIG. 15
[58] Field of Search ....................... 56/10.2, 11.7, 364, 56/DIG. 15, DIG. 2, DIG. 6, 10.4, 27.5; 171/9, 101

[56] References Cited

U.S. PATENT DOCUMENTS

| | | | |
|---|---|---|---|
| 3,269,098 | 8/1966 | Bushmeyer | 56/DIG. 2 |
| 3,589,109 | 6/1971 | Payne | 56/10.2 |
| 3,999,359 | 12/1976 | Jordan et al. | 56/10.2 |

*Primary Examiner*—Jay N. Eskovitz
*Attorney, Agent, or Firm*—Mills & Coats

[57] ABSTRACT

The present invention relates to a speed control unit associated with a peanut combine for driving and controlling the peripheral speed of a forwardly disposed crop engaging pick-up reel rotatively mounted transversely about the front of the peanut combine. The speed control unit basically includes a dual input drive system including a first drive operatively connected to at least one ground engaging wheel of the combine for providing an input drive corresponding to the ground speed of the peanut combine. A second generally constant input drive is provided from a power take-off source associated with the peanut combine. These two drives simultaneously drive a centrifugal clutch which includes an output drive member that is driven at a speed corresponding to the faster of the two input drives. In controlling the peripheral speed of the pick-up reel, the clutch assembly and speed control unit is so designed that the pick-up reel is driven from the output drive member of the clutch assembly such that the peripheral speed of the pick-up reel is generally equal the ground speed of the peanut combine as long as the ground speed of the combine is at least equal to or greater than a selected speed. Where the speed of the peanut combine falls below said selected speed, then the second generally constant input speed from the power take-off source is operative to drive the output drive member of the clutch assembly and consequently the peripheral speed of the pick-up reel is driven at a relatively constant speed in this case.

14 Claims, 6 Drawing Figures

SPEED CONTROL UNIT FOR DRIVING THE PICK-UP REEL OF A PEANUT COMBINE

The present invention relates to peanut combines and more particularly to a speed control unit or system for continuously controlling the peripheral speed of a pick-up reel associated with a peanut combine during harvesting to minimize field losses and to more efficiently utilize the harvesting capacity of the harvester.

BACKGROUND OF THE INVENTION

In peanut harvesting, peanut crop material including vines and attached peanuts generally lie on the ground after digging until the crop material is dried after which the peanut combine is moved through the field such that a rotatively driven pick-up reel engages the lying crop material and lifts and transfers the same upwardly into the crop inlet area of the peanut combine. Conventionally the pick-up reel has been driven at a relatively constant speed by the power take-off associated with the combine irrespective of harvester ground speed and/or crop density.

Field losses are often increased by the constant peripheral speed of the pick-up reel during the harvesting operation. This is generally due to the tine fingers of the pick-up reel snatching and jerking the peanut crop material from the ground during the harvesting operation. Such snatching and jerking often result in the attached peanuts being separated from the vines as the crop material is engaged and picked up and transferred into the inlet area of the combine. In addition, the actual velocity and speed of the tine fingers engaging the crop material often results in the tine fingers actually hitting and knocking the peanuts from the vines during the harvesting operation due in part at least to the fact that the peripheral speed of the tine fingers bears no relations to ground speed and consequently in certain cases the tine fingers may move faster than the peanut crop material being transferred into the peanut combine. In this regard, field losses are still often even greater after the peanut crop material has been inverted for drying on the ground because the vines become tied together and the tines during the harvesting operation tend to pick the peanuts off the vine and other foliage material. It should also be noted that certain varieties of peanut crop material, and weather conditions, also affect field losses since certain conditions can give rise to situations where less force is required to separate the peanuts from associated drying material.

In addition, the conventional manner of driving the pick-up reel of a peanut combine at a generally constant peripheral speed can result in overloading the thrashing and harvesting capacity of the combine in cases where the crop is relatively dense and the ground speed of the harvester is not altered to take such into account. This often results in a decrease in the life of the internal thrashing and harvesting components of the peanut combine not to mention clogging and the possibility that such overload will damage or break certain internal components of the peanut combine. Therefore, it is well appreciated that the life of a peanut combine and the overall quality and efficiency of harvesting can be improved by taking some steps to better control the input of peanut crop material into the harvester during the harvesting operation.

SUMMARY OF THE INVENTION

The present invention pesents a peanut combine having a speed control unit or system that is adapted to control the peripheral speed of a peanut combine's pick-up reel during the harvesting operation. Basically the speed control unit is designed to drive the pick-up reel such that its peripheral speed generally equals the ground speed of the peanut combine during the harvesting operation so long as the ground speed of the peanut combine is equal to or greater than a selected speed, the selected combine ground speed preferably being in the range of one-fourth to two miles per hour. Once the ground speed of the peanut combine is less than the selected speed, the speed control unit is adapted to drive the pick-up reel such that its peripheral speed is generally constant. Consequently, then during the normal harvesting mode as the peanut combine moves through the field, the ground speed thereof will generally be equal to or greater than the selected speed and the peripheral speed of the reel will vary with the combine's ground speed in order that the peripheral speed will generally equal the ground speed during the harvesting operation. In cases where the ground speed of the harvester falls below the selected speed, such as at the ends of rows and where the peanut crop material may accumulate and the harvester must be substantially slowed down or even stopped to accommodate the crop material, in such cases the speed control unit wil automatically cause the pick-up reel to be driven such that its peripheral speed is a generally constant speed and such is a function of an input drive from the power take-off of the harvester.

The speed control unit of the present invention basically comprises a centrifugal clutch having dual input drive members each of which are driven independently by a first input drive responsive to the ground speed of the peanut combine while the other input drive is driven by the power take-off associated with the peanut combine. The centrifugal clutch is adapted to provide an output speed corresponding to the faster of the two input speeds and this output torque is transferred through a secondary clutch and slip clutch assembly to the peanut reel where the same is driven thereby. Consequently, the output speed of the dual driven centrifugal clutch dictates the peripheral speed unless the drive from the centrifugal clutch is interrupted by the secondary clutch assembly or the associated slip clutch. Therefore, as long as the ground speed of the peanut combine is at least equal to or greater than the selected speed, then the pick-up reel is effectively driven at a speed such that the peripheral speed thereof is equal to the ground speed during the harvesting operation. This means that the relative velocity between the entering crop material being transferred into the combine by the pick-up reel and the combine itself is generally zero. This substantially minimizes field losses due to the jarring and snatching of the peanuts from the vines as is customary with pick-up reels having a purely constant peripheral speed. In addition, the control of the peripheral speed of the pick-up reel with respect to ground speed tends to provide a very efficient flow of crop material to the peanut combine during the harvesting operation without unduly overloading or damaging the thrashing and internal harvesting components thereof.

It is, therefore, an object of the present invention to provide a peanut combine having a speed control unit for controlling the peripheral speed of a pick-up reel associated with said combine so as to effectively minimize field losses of peanuts from crop material being picked up and delivered into said combine.

Another object of the present invention is to provide a method and apparatus for harvesting peanuts wherein during harvesting peanut crop material is gently picked up and transferred into a peanut combine harvester in such a manner that separation of the peanuts from the vine and other crop material is minimized.

Another object of the present invention is to provide a peanut combine having a speed control unit operatively associated with the pick-up reel thereof for continuously controlling the peripheral speed of the pick-up reel in relationship to the ground speed of the peanut combine during certain harvesting period such that the effective velocity between the crop material being delivered to the combine and the combine is generally zero.

Still a further object of the present invention resides in the provision of a speed control unit for a peanut combine for controlling the peripheral speed of the pick-up reel of the peanut combine such that the peripheral speed of the peanut combine is maintained at a speed generally equal to the ground speed of the peanut combine as long as the ground speed of the peanut combine is equal to or greater than a selected speed, and for driving and controlling the peripheral speed of the pick-up reel at a generally second constant speed when the ground speed falls below said selected speed.

It is also an object of the present invention to provide a mechanical speed control unit for the pick-up reel of a peanut combine wherein the mechanical speed control unit utilizes a dual driven centifugal clutch wherein the output speed thereof corresponds to the faster of two input speeds, one input speed being provided by the ground speed of said harvester while the other input speed is provided by the pto associated with said harvester, and wherein the output torque of the centrifugal clutch is adapted to drive the pick-up reel.

Another object of the present invention is to provide a mechanical speed control unit for a peanut combine such as that recited immediately above, wherein a second clutch assembly is provided for completely disengaging or engaging the drive to the pick-up reel such that during transport and periods where the harvester is being driven at a ground speed greater than a selected speed the pick-up reel can assume an inoperative mode due to the actuation of said second clutch assembly.

Other objects and advantages of the present invention will become apparent from a study of the following description and the accompanying drawings which are merely illustrative of the present invention.

DESCRIPTION OF THE PREFERRED EMBODIMENT

Figure 1:
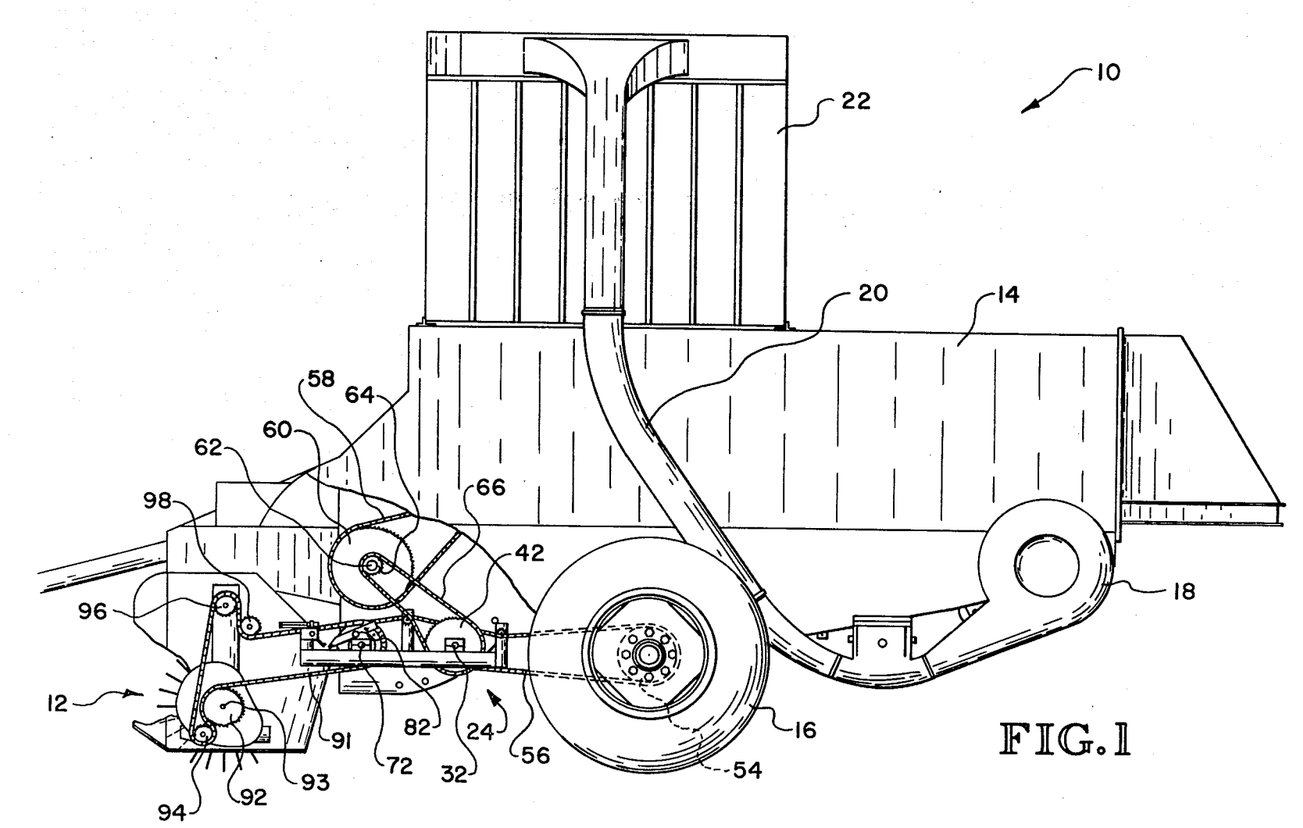
FIG. 1 is a side elevational view of a peanut combine having a speed control unit associated therewith for controlling the peripheral speed of the pick-up reel rotatively mounted about the front of said combine.

With further reference to the drawings, particularly FIG. 1, a peanut combine of the conventional pull type is shown therein and indicated generally by the numeral 10. Although a detailed discussion of such a peanut combine and the internal thrashing and harvesting mechanism will not be dealt with herein in detail because such is not per se material to the present invention and because the structure thereof is well known and appreciated in the art. Nevertheless, a brief discussion will deal with basic components and functions of the combine 10. In this regard, peanut combine harvester 10 is adapted to be hitched to a conventional farm tractor and pulled through the field for harvesting peanuts, with the power take-off of the farm tractor providing the basic power requirements for the harvesting components of the combine 10. Disposed about the lower front portion of the combine 10 is a pick-up reel, indicated generally by the numeral 12, which is rotatively driven in a clockwise manner, as viewed in FIG. 1, for picking up peanut crop material and delivering the same into the crop input area of the harvester. A main housing structure 14 generally encloses the internal thrashing cylinders and harvesting components found in such a conventional combine 10, while a pair of wheels 16 (only one of which is shown) supports the combine 10 as the same is pulled through the field during the harvesting operation.

A conveyor fan 18 is provided about a lower outside rear area of the peanut combine 10 and during the harvesting operation acts to blow peanuts from an adjacent area through conduit 20 into a storage basket container 22 disposed about the upper portion of the combine structure.

Figure 4:
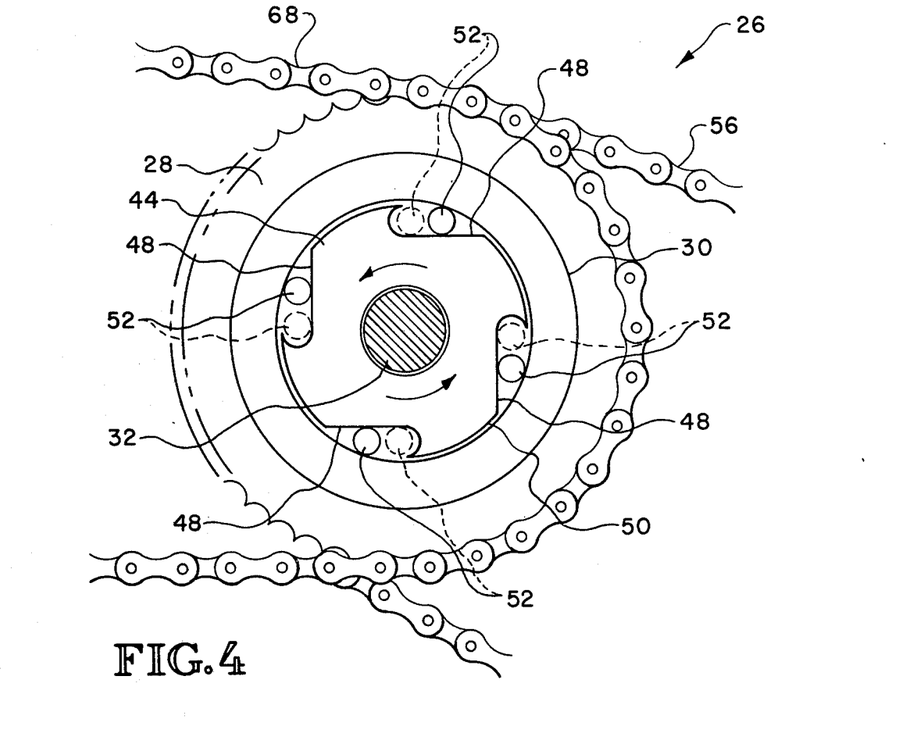
FIG. 4 is a fragmentary side sectional view taken along the lines 4—4 of FIG. 2.

The present invention involves a speed control unit, indicated generally by the numeral 24, which is adapted to control the peripheral speed of the combine's pick-up reel 12 especially during the harvesting operation. Viewing the speed control unit 24 in more detail, it is seen that the same basically includes a dual driven centrifugal clutch indicated generally by the numeral 26. Centrifugal clutch 26 includes an output drive member or output drive sprocket 28 formed about a drum or housing 30 that is rotatively journaled about stationary shaft 32 secured and supported transversely across frame structure 46. Rotatively journaled on both sides of said output sprocket 28 is a pair of input drive members 34 and 40. Input drive members 34 and 40 have sprockets 36 and 42 fixed respectively thereto and rotatable therewith. Also, input drive members 34 and 40 include end clutch plates 38 and 44, respectively, with the end clutch plates being disposed about each side of drum 30 in spaced apart relationship. Each clutch plate 38 or 44 includes a plurality of circumferentially indentions, as best seen in FIG. 4, formed therein with each indention 48 having an engaging pin 52 movably mounted within the indention and generally confined therein by the inner cylindrical side of the drum or housing 30 surrounding the outer circular edge 50 of each of the clutch plates 36 and 44 of the dual driven centrifugal clutch 26.

It will be appreciated from subsequent portions of the disclosure that the output sprocket 28 of the centrifugal clutch 26 is effectively driven by the faster rotating clutch plate 38 or 44 since the engaging pins 52 of the respective clutch plates tend to move radially from inwardly seat areas (shown in dotted lines in FIG. 4) to an outer area where the respective engaging pins wedged between the indentions 48 of the respective clutch plates and the inner cylindrical wall of the overlying drum 30. Where the RPM of a particular clutch plate 38 or 40 is greater than the RPM of the drum 30, it is seen that the engaging pins 52 will maintain a carrying wedge position between the respective clutch plate and the drum 30 so that the respective clutch plate in effect carries the drum 30 and the output sprocket 28 fixed thereto. Contrary to this, if the drum 30 is being driven at a greater RPM speed than a particular clutch plate is being driven, then the engaging pins 52 will allow the drum 30 to move in a relative counter clockwise direction, as viewed in FIG. 4, with respect to the slower rotating clutch plate.

As has already been noted, centrifugal clutch 26 is of the type adapted to receive two input drives. In the case of the present invention, a first ground speed input drive is provided by the provision of a sprocket 54 operatively connected to one of the ground engaging wheels 16 of the combine 10 and rotatable therewith, and wherein a chain 56 is trained around sprocket 54 and is drivingly connected to an input clutch sprocket 36 secured to the first input drive member 34. Consequently, during the harvesting operation, it is seen that the input drive member 34 and associated end clutch plate 38 is driven by chain 56 at a speed corresponding to the ground speed of the peanut combine 10.

Figure 2:
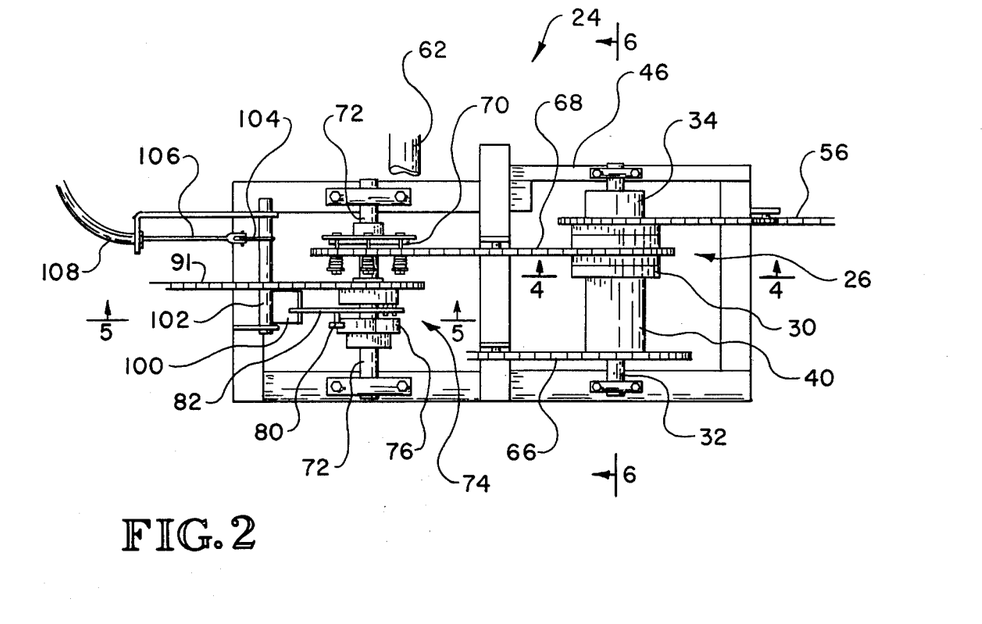
FIG. 2 is a fragmentary top plan view of the speed control unit referred to above.
Figure 3:
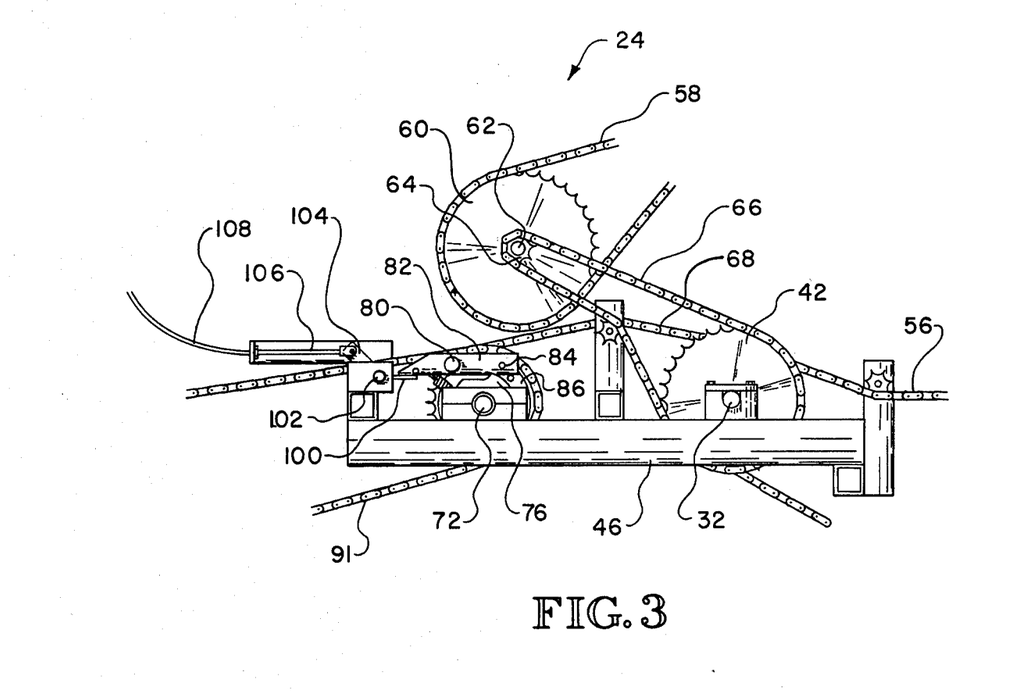
FIG. 3 is a fragmentary side elevational view of the mechanical speed control unit.

A second generally constant pto input drive is provided by the provision of a drive interconnecting a pto drive source on the peanut combine and sprocket 38 secured to the other input drive member 40 rotatively journaled on shaft 32. As generally illustrated in FIGS. 1 through 3, this second generally constant pto input drive includes a drive chain 58 operatively connected to a pto drive source and extending therefrom where the same chain is trained around a driven sprocket 60 which in turn drives shaft 62. Secured to shaft 62 and rotatable therewith is another drive sprocket 64 which has a chain 66 trained therearound that extends therefrom and is trained around drive sprocket 42 for driving the centrifugal clutch 26 about the other side.

Therefore, it is appreciated that during the harvesting operation the centrifugal clutch 26 is driven from one side by the chain drive 56 originating from sprocket 54 and which effectively drives the centrifugal clutch at a speed corresponding or proportional to the ground speed of the peanut combine. About the other side of the clutch 26, a second input drive, herein referred to as a generally constant pto input drive, is provided as just described. Consequently, then during the harvesting operation, both input drive members 34 and 40 are driven and the respective clutch plates 38 and 44 are likewise driven.

Because of the design of the clutch 26 and particularly the design of the clutch plates 38 and 44 with respect to the drum or housing 30, it is appreciated that the clutch plate rotating the fastest or having the greater RPM will be the effective driver of the output sprocket 28. Because the output sprocket 28 will as a general rule during harvest dictate the peripheral speed of the pick-up reel, then in accordance with the present invention the various sprockets utilized with the input drives and clutch 26 are such that as long as the ground speed of the peanut combine is equal to or greater than a selected speed then the design will assure that the output sprocket 28 is driven by the first ground speed input drive (chain 56) through the input drive member 34 and clutch plate 38. Where the ground speed falls below this selected ground speed or threshold speed, then the design assures that the second generally constant pto input drive will result in clutch plate 44 of the second input drive member 40 having a RPM greater than the other clutch plate 38, therefore, resulting in the output sprocket being driven at a constant RPM and consequently the peripheral speed of the pick-up reel being so driven.

In the present case, it is contemplated that a desirable threshold or selected speed would be approximately one mile per hour for the peanut combine 10. The selected speed could vary from one-fourth mile per hour to two miles per hour. But in any case, the sprocket size and number of teeth can be so designed, specified and arranged that once the selected or threshold ground speed is determined, then it follows that as long as the ground speed is equal to or greater than the selected speed that the peripheral speed of the pick-up reel 12 will be generally equal to the ground speed of the harvester. Anytime during the harvesting operation the ground speed falls below the selected or threshold speed, then the second generally constant pto input drive is effective to drive the pick-up reel 12 at a constant RPM and at a constant peripheral speed.

Continuing to discuss the speed control unit 24 of the present invention, it is already noted that the speed of the output sprocket 28 of the centrifugal clutch 26 actually determines the peripheral speed of the pick-up reel 12 in harvesting situations. But, it should be noted that the output sprocket 28 is adapted to drive a second clutch assembly, indicated generally by the numeral 74, disposed generally forwardly of the first clutch assembly 26. The second clutch assembly 74 is driven by a chain 68 trained around output sprocket 28 and a sprocket of a slip clutch 70 secured to shaft 72 that is also supported by frame structure 46. The driving torque supplied the slip clutch 70 is transferred to the second clutch assembly 74 supported by shaft 72.

Figure 5:
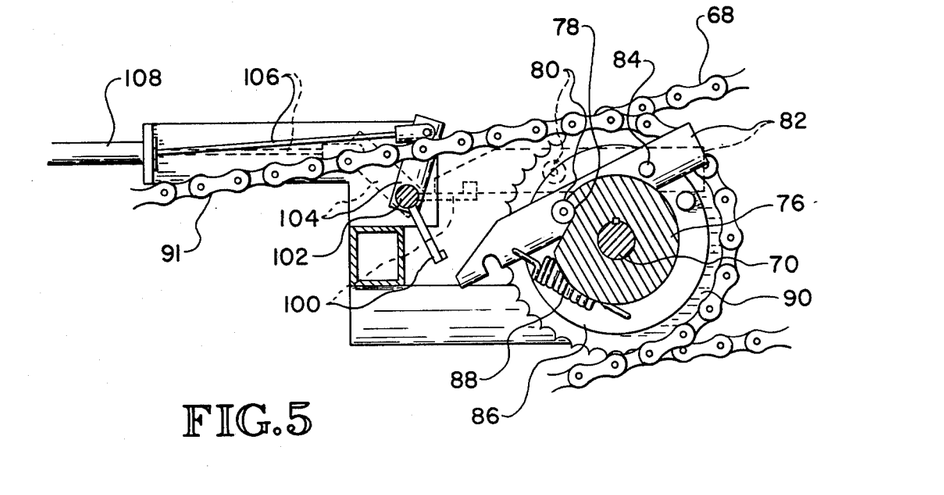
FIG. 5 is a fragmentary side sectional view taken along the lines 5—5 of FIG. 2.
Figure 6:
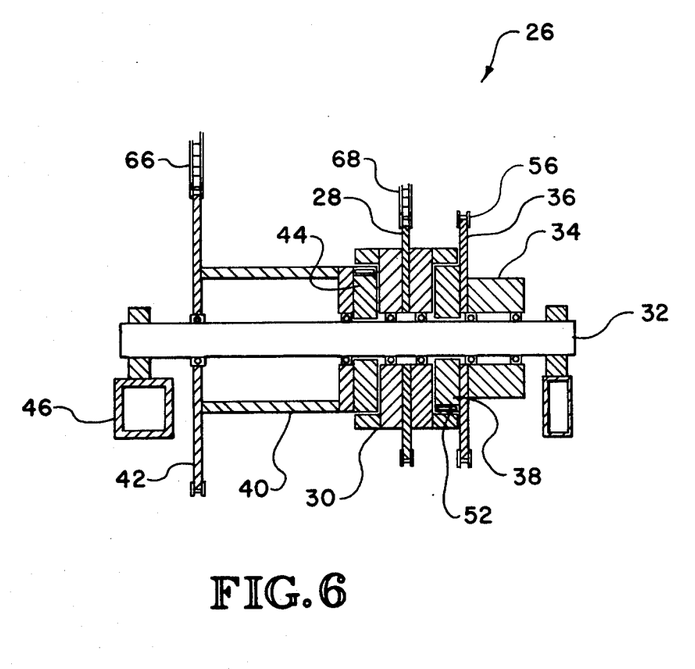
FIG. 6 is a transverse sectional view taken along the lines 6—6 of FIG. 2.

Viewing second clutch assembly 74 in detail, it is seen in FIG. 5 that the same includes a clutch plate 76 having a pawl engaging surface 78 (FIG. 5) formed therein. Pawl engaging surface 78 is adapted to engage a pawl 80 secured to lever 82 that is in turn pivotably mounted by a pivot pin 84 to a carrier housing rotatively journaled on shaft 72 and including an output drive sprocket 90 fixed thereto. A drive chain 91 is trained around drive sprocket 90 and a reel sprocket 92 that effectively drives a central shaft 93 of the pick-up reel 12. Also, chain 91 is also trained around a series of sprocket idlers 94, 96 and 98. Therefore, it is seen that the output of the drive sprocket 90 of the second clutch assembly 74 is effective to drive the pick-up reel 12 via the central shaft 93 of the pick-up reel.

Lever 82 is held in a downwardly pawl engaged position by a spring 88 that is connected between the lever 82 and the carrier housing 86. In this engaged position, the pawl 80 engages the pawl engaging surface 78 of the clutch plate 76 and since the clutch plate is keyed to shaft 72 which is driven by the slip clutch 70, then it follows that the engagement of the clutch plate with the pawl results in the carrier housing 86 and the drive sprocket 90 thereof being rotatively driven by the output sprocket of the dual input drive centrifugal clutch 26.

The second clutch assembly 74 discussed above is engageable and disengageable by the provision of a clutch control or finger lever 100 rotatively mounted about shaft 102 and acutated by a bell crank 104 through a remotely controlled cable 106 secured within a cable housing 108. Typically, this cable assembly would lead to the operator's station on a tractor where by moving the control lever 100 from the inoperative position (shown in full lines in FIG. 5) to the operative position (shown in dotted lines in FIG. 5), the control lever 100 then lies in the path of the actuating lever 82 such that once it rotates around to the position of the control lever 100, the control lever acts to pivot lever 82 to a position where the pawl 80 disengages the pawl engaging surface 78. This allows the clutch plate 76 to rotate without driving the output drive sprocket 90 of the second clutch assembly 74. This will allow the pick-up reel to assume an inoperative mode during transport or during other times when the operator does not wish for the pick-up reel to be rotatively driven.

From the foregoing specification, it is seen that the peanut combine 10 of the present invention is provided with a speed control unit 24 that during the typical harvesting situation allows the pick-up reel 12 to be driven such that its peripheral speed can be controlled to be generally equal to the ground speed of the harvester as long as the combine or harvester 10 ground speed is equal to or greater than a selected or threshold ground speed. In harvesting situations where the ground speed is not equal to or greater than the selected threshold speed, such as when the harvester or combine must slow down to take in large crop loads, then the speed control unit 24 in accordance with the present invention as set forth herein, controls the peripheral speed of the pick-up reel such that the reel is driven at a selected constant speed in accordance with the design of the sprockets and other drive components of the speed control unit and in relationship to the pto source speed. This tends to minimize field losses of peanuts as the pick-up reel during normal harvesting operations does not jerk and snatch the vines and crop material as is found with conventional constal reel speed drives. In addition, the speed control of the pick-up reel 12 tends to regulate or control the flow of crop material into the combine and to a great extent will increase the life of the thrashing and harvesting components of the combine as well as generally prevent overloading.

The terms "upper", "lower", "forward", "rearward", etc., have been used herein merely for the convenience of the foregoing specification and in the appended Claims to describe the speed control unit for driving the pick-up reel of a peanut combine and its parts as oriented in the drawings. It is to be understood, however, that these terms are in no way limiting to the invention since the speed control unit for driving the pick-up reel of a peanut combine may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. In a peanut combine having a pick-up reel for picking up and transferring peanut crop material into said peanut combine, the improvement comprising a speed control unit for driving the pick-up reel at a first peripheral speed generally corresponding to the ground speed of said peanut combine during harvesting except where the ground speed is less than a selected speed in which case the speed control unit is adapted to drive the pick-up reel at a generally constant second peripheral speed, said speed control unit for said peanut combine comprising: first input drive means responsive to the ground speed of said peanut combine for driving said speed control unit at a first speed proportional to the ground speed of said peanut combine during the harvesting operation; second input drive means for driving said speed control unit at a generally constant second speed; and control means responsive to both said first and second input drive means and operatively connected to said pick-up reel of said peanut combine for driving said pick-up reel at a peripheral speed approximately equal the ground speed of said peanut combine when said peanut combine's ground speed is generally equal to or greater than a selected speed, said control means being further operative to drive said pick-up reel at a generally constant peripheral speed independently of the ground speed of said peanut combine when the ground speed of said peanut combine is less than said selected speed.

2. The improved peanut combine of claim 1 wherein said control means includes a clutch assembly having first and second input drive members operatively connected to said first and second input drive means such that said first and second input drive members are respectively driven by said first and second input drive means; and wherein said clutch assembly includes an output drive member operatively associated with both said first and second input drive members and responsive to the drive speed of each such that said output drive member is driven by the input member having the greater RPM speed.

3. The improved peanut combine of claim 2 wherein said first and second input drive members and said output drive member of said clutch assembly are co-axially aligned and are rotatively driven about a common axis; and wherein said clutch assembly is of a centrifugal type with each input drive member including a clutch plate having a plurality of generally circumferentially disposed indentions formed therein, each indention including a movable engaging pin responsive to the centrifugal force due to the respective clutch plate being rotatively driven for moving outwardly about said clutch plate and engaging an outwardly disposed drum member forming a part of said output drive member, such that the clutch plate of the faster driven input drive member is operative to drive said drum member of said output drive member by the engagement of said engaging pins with said drum member while the same drum member may move relative to the other clutch plate of the other input drive member which is driven slower than the effective driven speed of said output drive member.

4. The improved peanut combine of claim 2 wherein a second clutch assembly is operatively interconnected between said output drive member and said pick-up reel for selectively completely disengaging said pick-up reel from the output drive of said first clutch assembly, whereby said pick-up reel may assume a completely inoperative mode by actuating said second clutch assembly in which case said peanut combine can be operated between harvesting operations and in transport without the pick-up reel being continuously driven.

5. The improved peanut combine of claim 4 wherein there is a slip clutch assembly operatively interconnected between the output member of said clutch assembly and said second clutch assembly so as to prevent said pick-up reel from being driven when the same engages an obstacle or encounters an overload situation.

6. In a peanut combine having a pick-up reel for picking up and transferring peanut crop material into said peanut combine, a speed control unit for driving the pick-up reel at a first peripheral speed generally corresponding to the ground speed of said peanut combine during harvesting except where the ground speed is less than a selected speed in which case the speed control is adapted to drive the pick-up reel at a generally constant second peripheral speed during harvesting; said speed control unit comprising:

(a) a first clutch assembly having means for receiving at least two input drives;

(b) a first ground speed input drive operatively connected to said first clutch assembly and responsive to the ground speed of said peanut combine for driving said first clutch assembly at a first speed proportional to the ground speed of said peanut combine during the harvesting operation;

(c) a second input drive operatively connected to said first clutch assembly for driving the same at a generally constant speed;

(d) said first clutch assembly having an output drive member and including means for driving said output drive members at a speed corresponding to the speed of the faster driven of the first and second input drives such that said output drive member of said first clutch assembly is effectively driven by said first ground speed input drive except where the ground speed of said peanut combine is less than a selected speed in which case said output drive member of said first clutch assembly is effectively driven by said second generally constant input drive;

(e) drive means interconnecting said output drive member of said first clutch assembly with said pick-up reel of said peanut combine for driving the same;

(f) said interconnecting drive means, first clutch assembly, and said first ground speed input drive being designed and adapted such that when said output member of said first clutch assembly is effectively driven by said first ground speed input drive that the peripheral speed of the driven pick-up reel is approximately equal to ground speed of said peanut combine; and (g) a second clutch assembly operatively associated with said speed control unit for completely interrupting the drive between said first clutch assembly and said pick-up reel such that the pick-up reel may assume a completely inoperative mode irrespective of the output speed of said output member of said first clutch assembly.

7. The peanut combine of claim 6 wherein said first ground speed input drive includes a drive member operatively connected between at least one ground engaging wheel of said peanut combine and said first clutch assembly; and wherein said second input drive includes a drive member operatively connected between a power take-off drive associated with said peanut combine and said first clutch assembly, such that said first clutch assembly is effectively driven during harvesting by both the ground speed of said harvester and said power take-off of said peanut combine.

8. The peanut combine and speed control unit of claim 7 wherein said first clutch assembly is of the centrifugal type and wherein said means of said first clutch assembly for receiving at least two input drives includes first and second co-axially driven input drive members operatively driven by said first and second input drives, each co-axially driven input drive member of said first clutch assembly including a clutch plate having engaging means associated therewith responsive to centrifugal force due to the rotation of said clutch plate for engaging an outer drum that forms a part of said first clutch assembly, said outer drum being secured to said output drive member of said first clutch assembly and rotatable therewith such that the faster driven clutch plate is effective to drive said drum in response to said engaging means engaging said drum to the centrifugal force associated with the respective clutch plates.

9. The peanut combine and speed control unit of claim 7 wherein said second clutch assembly is operatively connected between the pick-up reel and said clutch assembly and includes means for receiving the output drive of said clutch assembly and means for transferring the driving torque of said clutch assembly therefrom to said pick-up reel; said second clutch assembly further including actuating means that may be remotely controlled from the speed control unit for engaging and disengaging said second clutch assembly.

10. The peanut combine and speed control unit of claim 9 wherein said second clutch assembly includes a slip clutch that is operatively connected to the output drive member of said first clutch assembly to protect against reel overload.

11. The peanut combine and speed control unit of claim 10 wherein said second clutch assembly includes a driven transverse shaft rotatively driven by the output of said first clutch assembly, and wherein said second clutch assembly includes a clutch plate fixed to said transverse shaft and selectively engageable with a movable lever carried by a carrier housing and wherein said means for actuating said second clutch assembly and particularly engaging and disengaging said second clutch assembly includes a finger lever for operatively moving said lever from an engaged position with said clutch plate to a disengaged position.

12. A method of harvesting peanuts with a peanut combine having a pick-up reel that minimizes field losses and efficiently utilizes the harvesting capacity of the peanut combine, comprising the steps of: driving said pick-up reel at an initial generally constant peripheral speed, completely independently of the ground speed of the combine, when said peanut combine is idled; driving said pick-up reel at a peripheral speed at least equal to said initial constant speed in response to the peanut combine moving from an idle position to where the combine reaches a selected threshold ground speed; and then driving said pick-up reel at a peripheral speed generally equal to the ground speed of said combine after said combine reaches said selected threshold speed and for all ground speeds exceeding said selected threshold speed.

13. The method of harvesting peanuts of claim 12 wherein driving said pick-up reel at speeds from idle to said selected threshold speed and speeds therebeyond comprises: driving a dual speed input clutch with both a first input drive that is driven by at least one wheel of the peanut combine and a second input drive that is driven by a pto source on said combine; and transferring the output torque of said dual speed input clutch to said pick-up reel for driving the same.

14. The method of harvesting peanuts of claim 13 wherein the method further includes the step of disengaging the drive between said clutch assembly and said pick-up reel when it is desirable to move or transport the peanut combine without harvesting.

* * * * *